W. V. TURNER.
BRAKE CYLINDER PRESSURE REGULATOR.
APPLICATION FILED JULY 3, 1915.
1,219,606.
Patented Mar. 20, 1917.
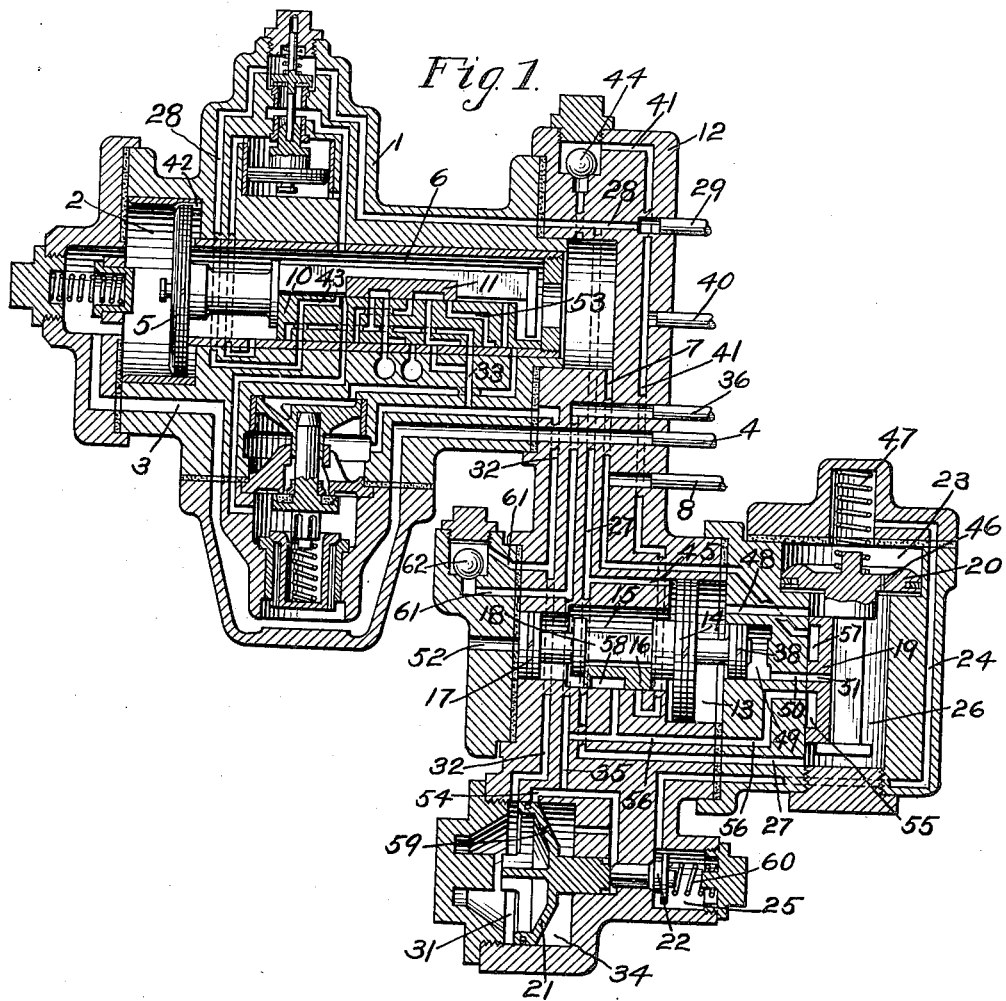
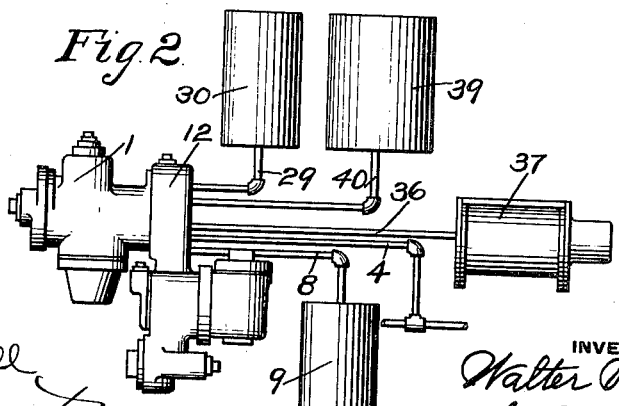
WITNESSES
H. W. Crowell
G. M. Clements
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

BRAKE-CYLINDER-PRESSURE REGULATOR.

1,219,606.  Specification of Letters Patent.  Patented Mar. 20, 1917.

Application filed July 3, 1915. Serial No. 37,891.

*To all whom it may concern:*

Be it known that I, WALTER V. TURNER, a citizen of the United States, residing at Edgewood, in the county of Allegheny and State of Pennsylvania, have invented new and useful Improvements in Brake-Cylinder-Pressure Regulators, of which the following is a specification.

This invention relates to fluid pressure brakes, and more particularly to means for securing uniform brake cylinder pressure, regardless of the piston travel or other cause tending to lessen the pressure.

A device of the above character is covered by my prior Patent No. 1,069,358, dated August 5, 1913, and while this construction operates satisfactorily to accomplish the desired result, it is necessary to modify the triple valve device to some extent, in order to properly control the brake cylinder pressure regulating device.

The principal object of the present invention is to provide a brake cylinder pressure regulating device adapted to be employed in connection with a triple valve device of the ordinary type or other brake controlling valves without the necessity for modifying the same.

In the accompanying drawing; Figure 1 is a central sectional view of a triple valve device with a brake cylinder pressure regulating device applied thereto and embodying my improvements; and Fig. 2 a diagrammatic view of a car air brake equipment including the valve mechanism shown in Fig. 1.

In the drawing, my invention is shown as applied in connection with a triple valve device of the well known L type, although it will be understood that the same is adapted to be employed with various other types of triple valve devices.

As shown, the triple valve device comprises a casing 1 having a piston chamber 2 connected by passage 3 with brake pipe 4 and containing piston 5 and having a valve chamber 6 connected by passage 7 and pipe 8 to auxiliary reservoir 9 and containing main slide valve 10 and graduating valve 11 adapted to be actuated by piston 5.

The brake cylinder pressure regulating portion may comprise a casing 12 applied to the rear end of the triple casing 1 and having a large piston chamber 13 containing a piston 14, and a valve chamber 15 containing a slide valve 16 adapted to be operated by piston 14.

A small piston 38 is carried by piston 14 at the front end and another piston 17 is attached to the piston stem 18.

For controlling the brake cylinder pressure regulating valve device a slide valve 19 operated by a piston 20 is employed, the slide valve and piston being in turn controlled by a pilot valve mechanism comprising a piston 21 and a pilot valve 22.

The piston 20 is contained in a piston chamber 23 having a passage 24 leading to valve chamber 25 containing pilot valve 22, and slide valve 19 is contained in valve chamber 26 connected by passages 27 and 28 and pipe 29 to a supplemental reservoir 30.

The pilot valve piston 21 is contained in a piston chamber 31 connected by a passage 32 to the usual service supply passage 33 and chamber 34 at the opposite side of the piston is connected by a passage 35 to pipe 36 leading to brake cylinder 37.

A supply reservoir 39 is connected by a pipe 40 to a passage 41 leading to the seat of the regulating slide valve 16.

In operation, fluid supplied to the brake pipe 4 flows to the triple valve piston chamber 2 and thence through the usual feed groove 42 to valve chamber 6, charging the auxiliary reservoir 9. The supplemental reservoir 30 is charged in the usual manner through port 43 in slide valve 10 and passage 28 and the supply reservoir 39 is charged from valve chamber 6 through passage 41, containing the ball check valve 44.

The valve chamber 15 is maintained charged from the supplemental reservoir 30 through passages 27 and 45 and valve chamber 26 is charged from the same source through the passage 27.

From valve chamber 26, fluid under pressure equalizes through the small port 46 in piston 20 to piston chamber 23, thus permitting the spring 47 to maintain the piston in the position shown, since the opposing fluid pressures on the piston are then balanced.

Piston chamber 13 is now connected by passage 48 with valve chamber 26 and likewise piston chamber 49 by way of passage 50 and port 51, and since the outer face of piston 17 is open to the atmosphere through a passage 52, the regulating valve device will be maintained in the normal position shown in Fig. 1 of the drawing.

When the brake pipe pressure is reduced to effect a service application of the brakes, the triple valve piston 5 moves the main valve 10 and the graduating valve 11, so that service port 53 registers with passage 33. Fluid from the auxiliary reservoir then flows through passage 32 to piston chamber 31 and the pilot valve piston 21 is operated so as to uncover a branch passage 54 and permit fluid to flow from the auxiliary reservoir through passage 35 to the brake cylinder 37. The pilot valve 22 is also opened and fluid is thus vented from piston chamber 23 through passage 24 to brake cylinder passage 35 faster than fluid can equalize through the restricted port 46. The piston 20 will therefore move outwardly against its seat and the slide valve 19 is shifted, so that cavity 55 connects passage 50 with passage 56 leading to brake cylinder passage 35, thus subjecting piston 38 to brake cylinder pressure.

Slide valve 19 also connects passages 7 and 48 through a cavity 57, so that fluid at auxiliary reservoir pressure is supplied to piston chamber 13.

If the rise in brake cylinder pressure is at the desired predetermined rate, the fall in auxiliary reservoir pressure in piston chamber 13 will be compensated for by the rise in brake cylinder pressure in piston chamber 49, and no movement of the regulating valve will take place.

If, however, the brake cylinder pressure should not build up at the predetermined rate, as would be the case where the brake cylinder piston travel exceeds the predetermined minimum, then the force exerted by supplemental reservoir pressure in valve chamber 15 will exceed the force of the auxiliary reservoir pressure in piston chamber 13 and the brake cylinder pressure in piston chamber 49, acting in the opposite direction and the parts will then move to the right, so that cavity 58 in slide valve 16 connects passage 56 with passage 41. Fluid under pressure can then flow from the supply reservoir 39 to the brake cylinder 37 until the brake cylinder pressure has been increased to correspond with the fall in auxiliary reservoir pressure, when the force of the auxiliary reservoir and brake cylinder pressures on the respective pistons 14 and 38 will exceed the force of the supplemental reservoir pressure in valve chamber 15 and the parts will be returned to normal position, cutting off the further admission of fluid from the supply reservoir to the brake cylinder.

When the auxiliary reservoir pressure has reduced by flow to the brake cylinder to a degree slightly less than the reduced brake pipe pressure, the triple valve parts will move to service lap position in the usual manner, lapping the service port 53. Fluid pressures on piston 21 will then quickly equalize through the restricted port 59 in the piston, permitting the spring 60 to return the pilot valve 22 to its seat. The fluid pressures on piston 20 will then equalize through the restricted port 46 and said piston with the slide valve 19 will be moved to normal position by the spring 47, cutting off communication from the auxiliary reservoir and the brake cylinder to the regulating valve device.

Upon movement of the triple valve parts to release position in releasing the brakes, fluid is exhausted from the brake cylinder through a passage 61 connecting the passages 35 and 32, and containing a non-return ball check valve 62.

It will now be evident that the regulation of the brake cylinder pressure to compensate for varying piston travel is accomplished by means of an attachment which does not require any modification of the triple valve device.

In the present construction, a separate reservoir is employed for boosting the brake cylinder pressure instead of taking air from the usual supplemental reservoir, so that the supplemental reservoir pressure can be maintained at the initial pressure for graduated release.

The auxiliary reservoir is preferably proportioned for the predetermined minimum piston travel and the combined volume of the supply and auxiliary reservoirs is proportioned for the predetermined maximum piston travel.

Having now described my invention, what I claim as new and desire to secure by Letters Patent, is:

1. In a fluid pressure brake, the combination with a brake cylinder and a valve device for controlling the application of the brakes, of a valve mechanism for regulating the brake cylinder pressure and valve means controlled by said valve device for cutting said valve mechanism into and out of action.

2. In a fluid pressure brake, the combination with a brake cylinder and a triple valve device for controlling the application of the brakes, of a valve mechanism for regulating the brake cylinder pressure to compensate for variations in brake cylinder volume and means operated by the flow of air to the brake cylinder in applying the brakes for cutting said valve mechanism into action.

3. In a fluid pressure brake, the combination with a brake cylinder and a triple valve device for controlling the application of the brakes, of a valve mechanism for regulating the brake cylinder pressure to compensate for variations in brake cylinder volume and means operated by the flow of air through the triple valve service port for cutting said valve mechanism into action and adapted to cut said valve mechanism out of action when the service port is lapped.

4. In a fluid pressure brake, the combination with a brake cylinder, auxiliary reservoir, and a triple valve device for controlling the application of the brakes, of a valve mechanism controlled by brake cylinder and auxiliary reservoir pressures for regulating the brake cylinder pressure and means controlled by the triple valve device for controlling the admission of fluid from the brake cylinder and the auxiliary reservoir to said valve mechanism.

5. In a fluid pressure brake, the combination with a brake cylinder, auxiliary reservoir, and a triple valve device for controlling the application of the brakes, of a valve mechanism controlled by brake cylinder and auxiliary reservoir pressures for regulating the brake cylinder pressure and means operated by the flow of air in applying the brakes for opening communication for supplying fluid from the auxiliary reservoir and the brake cylinder to said valve mechanism.

6. In a fluid pressure brake, the combination with a brake cylinder, auxiliary reservoir, and a triple valve device for controlling the application of the brakes, of a valve mechanism controlled by brake cylinder and auxiliary reservoir pressures for regulating the brake cylinder pressure and means normally cutting off communication from the auxiliary reservoir and brake cylinder to said valve mechanism and operated in applying the brakes for opening said communication.

7. In a fluid pressure brake, the combination with a brake cylinder, auxiliary reservoir, and a triple valve device for controlling the application of the brakes, of a valve mechanism controlled by brake cylinder and auxiliary reservoir pressures for regulating the brake cylinder pressure and means normally cutting off communication from the auxiliary reservoir and brake cylinder to said valve mechanism and operated by the flow of fluid to the brake cylinder in applying the brakes for opening said communication and adapted when said flow is cut off for closing said communication.

8. In a fluid pressure brake, the combination with an auxiliary reservoir, a brake cylinder, and valve device for controlling the application of the brakes, of a valve mechanism governed by brake cylinder and auxiliary reservoir pressures for regulating the brake cylinder pressure, a main valve and piston for controlling communication from the auxiliary reservoir and brake cylinder to said valve mechanism and a pilot valve device operated in applying the brakes for controlling the operation of said valve and piston.

In testimony whereof I have hereunto set my hand.

WALTER V. TURNER.

Witnesses:
A. M. CLEMENTS,
BARBARA HERBERT.